United States Patent [19]
Olson et al.

[11] Patent Number: 5,324,072
[45] Date of Patent: Jun. 28, 1994

[54] SIDE IMPACT AIR BAG

[75] Inventors: Brent Olson, Clearfield; Kirk Storey, Farmington, both of Utah

[73] Assignee: Morton International, Inc., Chicago, Ill.

[21] Appl. No.: 949,210

[22] Filed: Sep. 23, 1992

[51] Int. Cl.[5] .............................................. B60R 21/22
[52] U.S. Cl. .............................. 280/730 A; 280/728 A
[58] Field of Search ........... 280/728 B, 730 R, 730 A, 280/743 R, 736, 741, 728 A, 728 R

[56] References Cited

U.S. PATENT DOCUMENTS

| | | | |
|---|---|---|---|
| 3,768,830 | 10/1973 | Hass | 280/732 |
| 3,897,961 | 8/1975 | Leising et al. | 280/730 |
| 4,076,277 | 2/1978 | Kuwakado et al. | 280/738 |
| 4,966,388 | 10/1990 | Warner et al. | 280/730 |
| 5,033,236 | 7/1991 | Szerdahelyi et al. | 280/730 |
| 5,064,218 | 11/1991 | Hartmeyer | 280/731 |
| 5,094,475 | 3/1992 | Olsson et al. | 280/736 |
| 5,129,674 | 7/1992 | Levosinski | 280/732 |

FOREIGN PATENT DOCUMENTS

| | | | |
|---|---|---|---|
| 4204280 | 8/1992 | Fed. Rep. of Germany | 280/730 |
| 2249740 | 10/1990 | Japan | 280/730 |
| 2303951A | 12/1990 | Japan. | |
| 3281459 | 12/1991 | Japan | 280/730 |
| 3284443 | 12/1991 | Japan | 280/730 |
| 0446836 | 2/1992 | Japan | 280/730 |

*Primary Examiner*—Margaret A. Focarino
*Assistant Examiner*—Paul Dickson
*Attorney, Agent, or Firm*—Gerald K. White

[57] ABSTRACT

A dual cushion air bag unit for cushioning contact between an occupant and interior side members of a vehicle during a side impact collision includes a lower bag portion and an upper bag portion which are joined by a relatively short and narrow neck portion in communication with both of said upper and lower bag portions and in which is located, in sealed relation, at least the outlet ports of a gas generator or inflator. Both of the lower and the upper bag protions are filled simultaneously by one inflator.

20 Claims, 7 Drawing Sheets

SIDE IMPACT AIR BAG

BACKGROUND OF THE INVENTION

1. Field of the Invention

This invention relates to an improvement in inflatable bag means for absorbing energy produced by side impact forces on a vehicle body. More particularly, the invention relates to an inflatable bag means having utility in automotive vehicles for cushioning contact between an occupant and structural interior members of a vehicle during a collision involving a side impact.

2. State of the Art

Inflatable occupant restraint devices for restraining occupants of automotive vehicles during frontal collisions are known in the art. Inflatable bags commonly known as air bags are inflated rapidly in response to the onset of a collision. An inflated air bag provides a cushioning restraint for an occupant of a vehicle from harmful contact with the steering wheel, instrument panel and windshield.

Although of great utility in situations involving frontal collisions, the degree of protection that is provided by such inflatable occupant restraint devices for a vehicle occupant during a collision involving impact on a side of the vehicle is less than desirable. In a side impact collision, the occupant is exposed to possible injurious contact with the door or other elements including the windows on the sides of the vehicle interior.

It has been proposed in the prior art to provide inflatable air bags for the protection for an occupant including the driver seated adjacent to a side panel of a vehicle during a collision involving impact with the side panel by another vehicle.

The state of the art relating to the use of air bags for absorbing energy produced by a side impact force on a vehicle body is represented by the disclosures of the following patents and patent application:

| Patent No. | Issue Date | Patentee |
|---|---|---|
| U.S. 4,966,388 | Oct. 30, 1990 | C. Y. Werner, et al. |
| Jap. 2-303951 | Dec. 17, 1990 | Kiyoshi Mamiya |
| Patent Application | Laid Open Date | Applicant |
| Jap. He14-46836 | Feb. 17, 1992 | Mazda Motor Corporation |

U.S. Pat. No. 4,966,388 discloses an inflatable air bag restraint that is placed below the window opening within a door of a vehicle. An impact sensor and an inflator in flow communication with the bag are placed within the door. Inflated upwardly, when activated, the air bag extends over the window opening in the door and provides a cushion that prevents the occupant from striking elements of the door and restrains the head of the occupant from being ejected out of the window opening. With this arrangement no cushioning protection against side impact forces is provided for the hip and torso of the occupant.

Japanese patent 2-303951 discloses in combination with an air bag main unit inflated by an inflator for protecting the occupant of a vehicle during a front part collision of a vehicle, a subbag part distal to the inflator, which subbag part is provided successively in line with a rear end side part of the bag main unit to be inflated at the time of inflation of the bag main unit. The subbag is inflated between the occupant and a door in the vehicle body side part to prevent the occupant from colliding against the door. With this arrangement inflation of the subbag part is delayed pending filling of the bag main unit. Thus, initially, no protection is provided to impede movement of the hip and torso of the occupant into colliding contact with the door.

Japanese application He14-46836 discloses a cell or receptacle provided on the interior side of a vehicle body. Contained within the cell are a deflated primary energy absorption bag, a deflated secondary energy absorption bag, and a separate inflator for each bag. Upon activation of the inflator, the primary energy absorption bag inflates downwardly along the side interiorly of the vehicle and the secondary absorption bag inflates upwardly. This arrangement allows the primary energy absorption bag and the secondary absorption bag to be filled at the same time but requires the use of a separate inflator for each of the bags. The need for a separate inflator to fill each of the bags not only adds to the cost but introduces complication into the manufacturing and assembling of the equipment.

Thus, there is a need and a demand for improvement in inflatable air bag means for absorbing energy produced by a side impact force to a vehicle body thereby to provide a greater degree of protection for an occupant seated adjacent to the side of the vehicle body that is impacted.

SUMMARY OF THE INVENTION

An object of the invention is to provide an improved occupant restraint inflatable bag unit for absorbing energy produced by a side impact force on a vehicle body.

Another object of the invention is to provide such an improved occupant restraint inflatable bag unit comprising a dual cushion air bag located in a door or other side panel part of a vehicle, with both portions of the air bag being inflated by only one inflator.

A further object of the invention is to provide such an improved occupant restraint dual cushion air bag unit that is characterized in that both portions of the air bag can be filled simultaneously from the same inflator with the pressure in each portion of the bag controlled by selecting proper materials of construction and by the use of proper venting.

In accomplishing these and other objectives of the invention, there is provided a dual cusion air bag unit in a side panel or door or other part of an automotive vehicle (including seats, etc.). The dual cushion air bag unit is comprised of a lower bag portion and an upper bag portion. Both portions of the bag are filled or inflated by only one inflator. Both portions of the bag can be filled simultaneously. The pressure in each bag portion can be controlled by the selection of proper materials of construction and by the use of proper venting. The pressure in the upper and lower portions of the bag can be controlled by varying the porosity of the bag material. In general, the less porous the material the higher the pressure in that portion of the bag.

In a preferred embodiment of the invention, as illustrated herein, the volume of the lower bag portion of the dual cushion air bag is less than that of the upper bag portion. Upon deployment, the lower portion of the bag fills before the upper portion. This provides vehicle occupant hip and torso protection first, which is advantageous since such protection is needed first. The upper portion of the bag fills partially while the lower portion is filling to capacity. The upper portion of the bag then continues to fill to capacity before it is needed for protection of the head of the occupant. Such filling is controlled by varying the relative volumes of the upper and lower portions of the bag, and by proper selection of the materials of the fabric of each portion of the bag as required to achieve desired porosities.

The various features of novelty which characterize the invention are pointed out with particularity in the claims annexed to and forming a part of the specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying drawings which form part of the specification, of which.

DESCRIPTION OF THE PREFERRED EMBODIMENT

Referring to the drawings, an improvement in inflatable bag means is shown which provides cushioning and containment of an occupant of a vehicle during a collision involving side impact of the vehicle by a harm producing object such as another vehicle.

Figure 1:
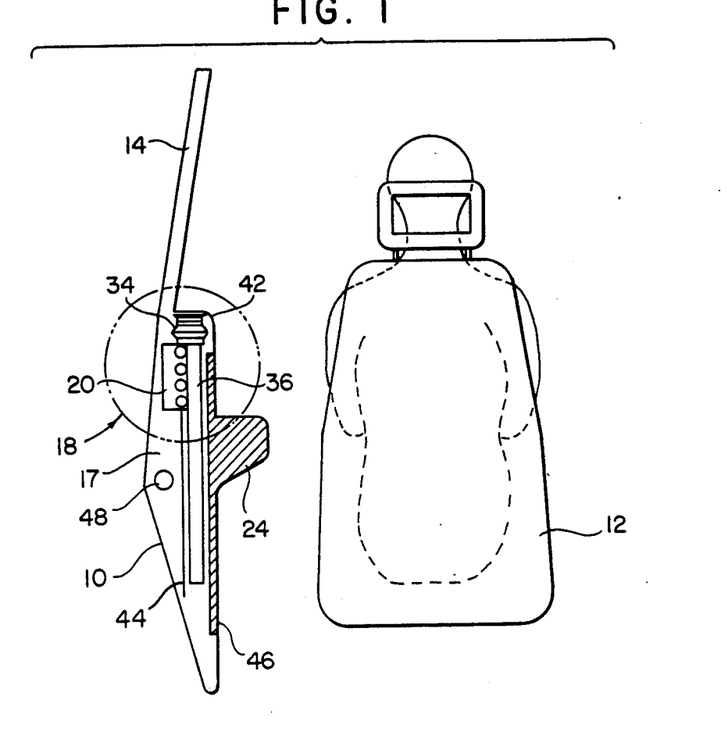
FIG. 1 is a sectional view through the door of a vehicle illustrating an embodiment of a dual cushion air bag unit, according to the invention, located in a cavity therein, with an occupant seated in an adjacent seat.

As shown in FIG. 1, a side panel 10 of a conventional automotive vehicle is located adjacent a seat 12 upon which an occupant to be protected is shown seated. The side panel 10 is a side door of a vehicle. It will be apparent, however, to those skilled in the art that the present invention is applicable generally to any side panel of an automotive vehicle. That is to say, the invention is not limited to application to a door panel and could be applied to a side panel adjacent to the back seat of a conventional two door passenger automobile and also to the side panels and doors of trucks. As shown in the drawings, a window 14 is located at the upper end of the side panel 10.

Figure 3:
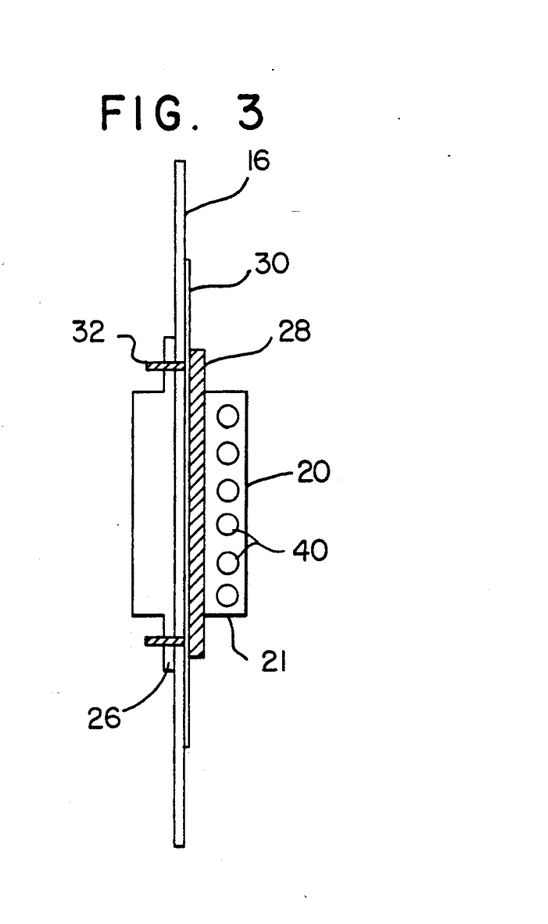
FIG. 3 is a side view of the inflator of the dual cushion air unit of FIGS. 1 and 2 illustrating the attachment thereof to a gas inlet or mouth of the dual cushion air bag and to a supporting member or plate in a cavity within the door.

As shown in FIGS. 1 and 3, a mounting plate 16 is located within a cavity 17 in the door 10. The mounting plate 16 is fixedly secured within the door 10 by any suitable means, being attached to an integral element of the door therein, or optionally, comprising such integral door element itself if in proper location to permit such use thereof.

A dual cushion air bag unit 18 comprising an inflator or gas generator 20 and a dual cushion air bag 22 are fastened to the mounting plate 16 at a position above the arm rest 24 on the door 10 of the vehicle. Fastening is effected by means of or through a flange 26 on the inflator 20 and a retaining ring 28 with a portion 21 of the inflator 20 extending through a hole in the plate 16, a gas inlet opening or mouth 30 of the air bag 22, and the retaining ring 28. The cross section of the retaining ring 28 preferably is a channel. A plurality of fasteners 32 fixedly attach the dual cushion air bag unit 18 to the plate 16. To that end, the fasteners 32 are arranged at appropriate intervals around the flange 26 and retaining ring 28 and fit into and are secured in aligned holes provided in mounting plate 16.

Figure 5:
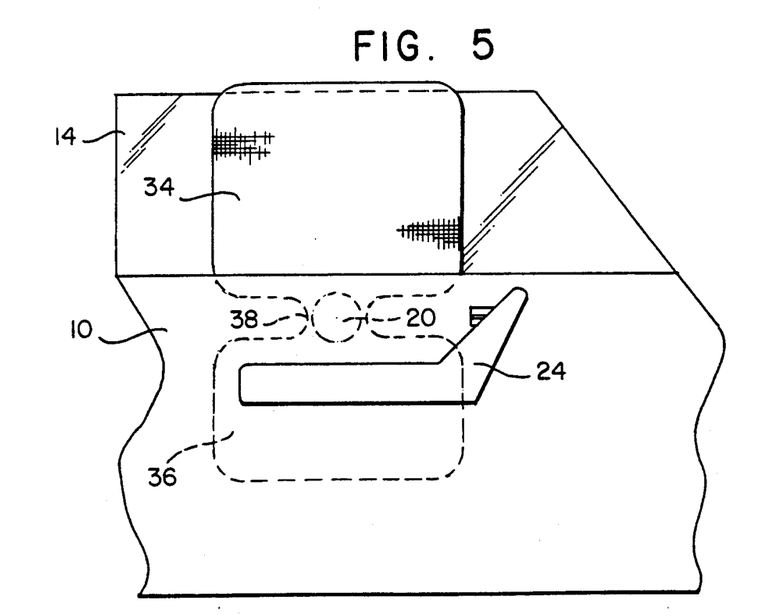
FIG. 5 is a front view similar to that of FIG. 2, but illustrating, immediately following deployment, the dual cushion air bag in the inflated expanded condition.
Figure 6:
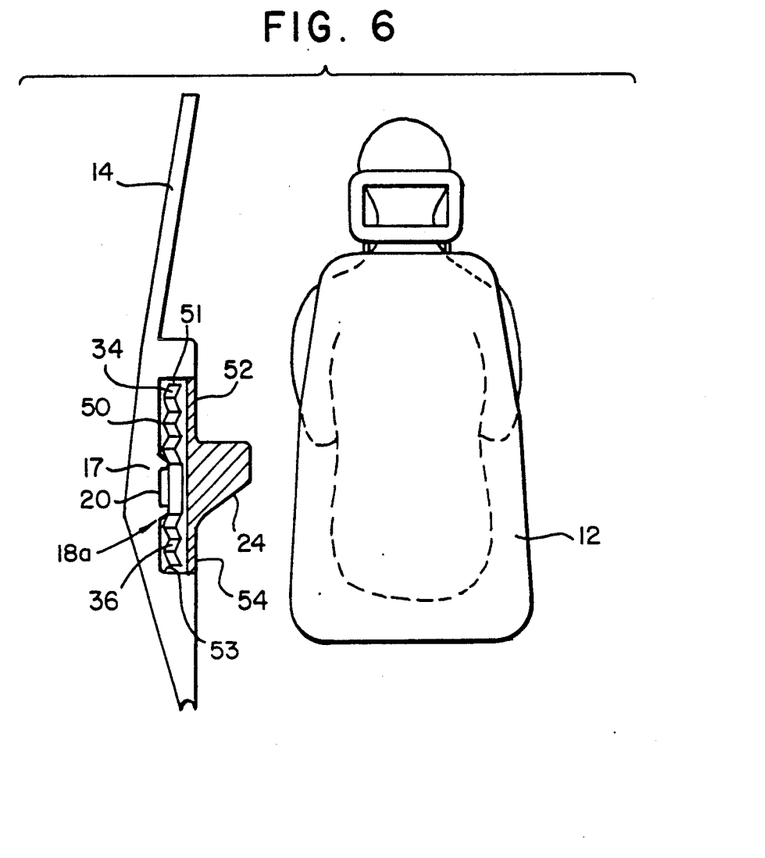
FIG. 6 is a sectional view through the door of a vehicle illustrating a modification of the embodiment of FIGS. 1-5, in which modification the dual cushion air bag unit is shown mounted within a cavity in the door on the level of and behind the arm rest, and wherein, as stored and unpressurized, both of the lower and upper portions of the bag are in a compactly folded state.

Inflator 20 may be a pyrotechnic type, as disclosed, for example, in U.S. Pat. No. 4,943,086 to Donald J. Cunningham, which patent is assigned to the assignee of the present invention. Inflator 20 is characterized in that the gas generated thereby flows generally radially outwardly from a plurality of ports 40 that are arranged at substantially equal intervals around the circumference of the inflator portion 21. The ports 40 are provided in the portion 21 of the inflator 20 which portion is substantially circular in transverse cross section, as indicated by dotted lines in FIGS. 2 and 5, is contained in sealed relation within the neck portion 38 of the air bag 22.

The dual cushion air bag unit 22 includes an upper bag portion 34 and a lower bag portion 36. As best seen in FIGS. 2 and 5, the upper portion 34 and the lower bag portion 36 are joined or connected by a relatively short and narrow neck portion 38 which is integral therewith and in which the inflating gas inlet opening or mouth 30 is formed. When fastened to the air bag 22, the portion 21 of the inflator from which the generated gas flows extends inwardly into the mouth 30 and is contained in sealed relation within the neck portion 38 of the air bag 22.

For facilitating the assembly of the dual cushion air bag 22 to the inflator 20 and the mounting plate 16, the retaining ring 28 may be riveted in conventional manner to the fabric of the air bag 22 in appropriate surrounding relation to the gas inlet opening or mouth 30. If desired, the retaining ring 28 may be of the rivetless type that is disclosed and claimed in application for U.S. patent bearing Ser. No. 07/767,032, filed by John A. Allard on Sep. 30, 1991, which application is assigned to the assignee of the present invention.

Figure 2:
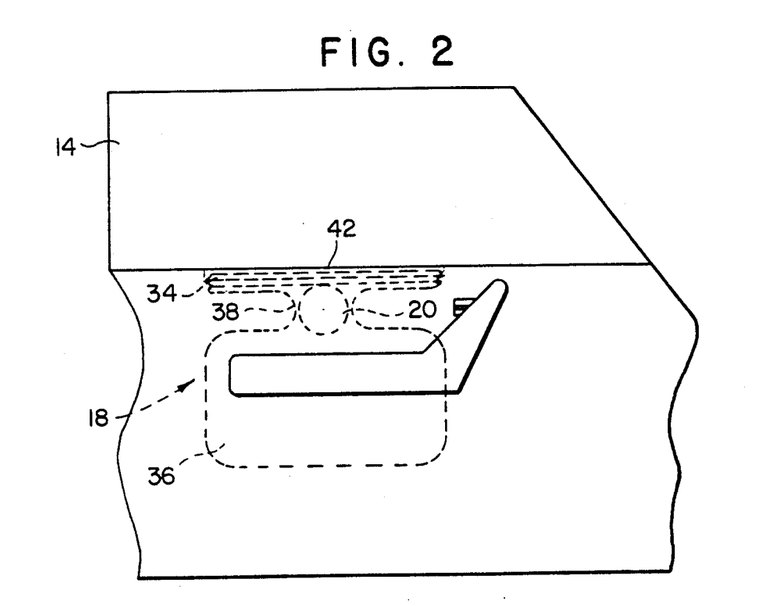
FIG. 2 is a schematic front view of the inner side of the door of FIG. 1 showing in dotted outline the dual cushion air bag unit as installed therein.
Figure 2A:
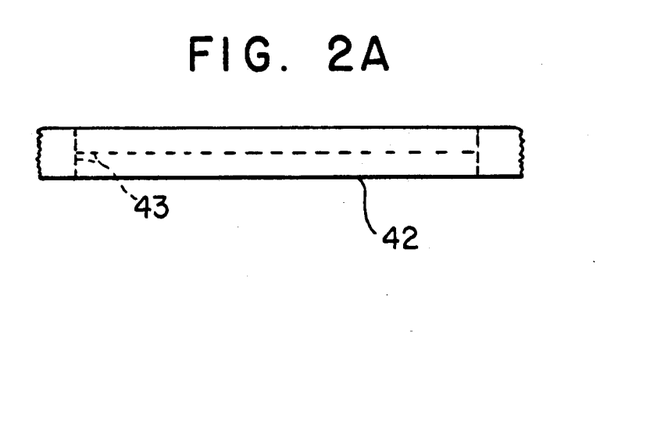
FIG. 2A is a fragmented top view of a cover for an upper portion of the air bag of FIGS. 1 and 2.

Installed in the door 10 ready for deployment responsively to the force of a side impact collision, as seen in FIGS. 1 and 2,, the lower portion 36 of the air bag 22 hangs downwardly in cavity 17 in an unfolded and unpressurized state. The upper portion 34 of the air bag 22, on the other hand, is compactly folded with folds extending over the entire width of the upper bag portion 34, parallel to the width of the door 10, as indicated by dotted lines in FIG. 2. The folded air bag portion 34 is contained within an upper portion of the cavity 17 in the door 10, being covered by a first cover means, cover 42. Cover 42 comprises a lid portion and is provided in known manner, as illustrated in the fragmented view of FIG. 2A, with tear seams or break lines 43 to allow the upper portion 36 of the bag 22 to break out of the cover 22 during deployment of the bag 22. It is contemplated that the cover 42 may incorporate, or if desired, consist entirely of elements of the decorative upholstery provided in automotive vehicles.

For the protection of the downwardly extending lower portion 36 of the air bag 22 against possibly damaging contact with sharp or abrasive inner elements of the door 10, a protective shield or curtain 44 as indicated at 44 may be provided. Such a shield may be made of a fabric sheet similar to but much tougher than that of which the air bag portion 36 is made. A suitable plastic sheet may also be employed as such a shield.

Figure 4:
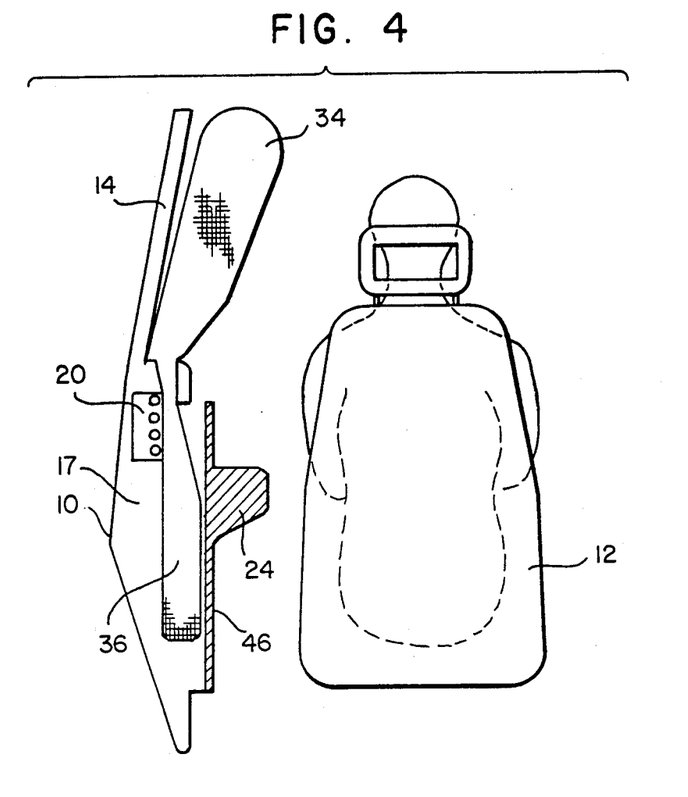
FIG. 4 is a side view similar to that of FIG. 1 but shows the dual cushion air bag, immediately following deployment, in the inflated expanded condition thereof.

Provided on the interior side of the door 10 adjacent the downwardly hanging lower portion 36 of the air bag 22 are a second cover means therefor comprising a padded push out panel 46. The padded push out panel 46 is normally retained in place by push pins or other suitable retention means (not shown) but known to those skilled in the art, which retention means allow the padded push out panel 46 to be pushed out, as illustrated in FIG. 4, upon deployment of the lower portion 36 of the air bag 22. Suitable tether or other guide means (not shown) may be provided to guide and restrain the padded push out panel 46 as it is pushed out.

An impact sensor, shown at 48 in FIG. 1, is appropriately mounted within the cavity 17 or other suitable adjacent region of the door 10. The impact sensor 48 may embody a built-in power source means or optionally derive power from the electrical system of the vehicle. In either case, the sensor 48 is operative upon sensing the force of a side impact collision to the vehicle to initiate the production of inflating gas by the inflator 20 for inflating and deploying the air bag 22.

Upon such initiation of the inflator 20, the air bag 22 is inflated to form a broad, substantially planar air cushion having an inflated upper portion 34 and an inflated lower portion 36, as illustrated in the side view of FIG. 4 and the front view of FIG. 5. The dimensions of the lower portion 36 are sufficient to provide protection for the hips and torso of the occupant, with the dimensions of the upper portion 34 being sufficient to provide protection for the occupant's shoulders and head, extending upwardly substantially over the window 14 in the door 10. Thus, the deployed dual cushion air bag 22 forms a shock absorbing cushion for the hip, torso and head of the occupant seated in seat 12. With the lower portion 36 filled to capacity first, as previously described herein, the inflated air bag 2 provides protection first for the hip and torso since such protection is needed first. The upper portion 34 continues to fill to capacity and is completely filled before it is needed for head protection.

A feature of the dual cushion air bag unit 18 according to the invention is the use therein of a thrust neutral inflator 20 whether of the driver's side type disclosed in the aforementioned U.S. Pat. No. 4,943,086 or of a passenger side type described hereinafter. By thrust neutral is meant the production by the inflator of substantially zero thrust when initiated responsively to an impact to the side panel or door 10, or initiated accidentally, as for example, during shipping, handling and/or storage. That is to say, the gas discharge ports 40 are so positioned that the generated gas is discharged radially in opposing directions whereby there are no resulting forces tending to cause physical movement of the inflator 20. As a consequence, the inflator 20, when activated, expends the energy generated thereby generally in place thus minimizing the stress to which the mounting plate 16 and related structure of side panel or door 10 is subjected upon deployment of the dual cushion air bag unit 18.

By way of illustration and not limitation, it is noted that in an embodiment of the invention as illustrated in FIGS. 1-5, the widths of each of the upper and lower portions 34 and 36 of the air bag 22 is twenty-four (24) inches (60.96 cm), the overall height of the air bag 22 including the neck portion 38 is thirty-nine (39) inches (99.06 cm), the height of the upper bag portion 34 is approximately twenty-one (21) inches (53.34 cm), and the height of the lower bag portion 36 is approximately thirteen and one-half (13.5) inches (34.3 cm), with the height of the neck portion being about four (4) inches (10.2 cm) and the length thereof about five and one-half (5.5) inches (14.0 cm).

Figure 7:
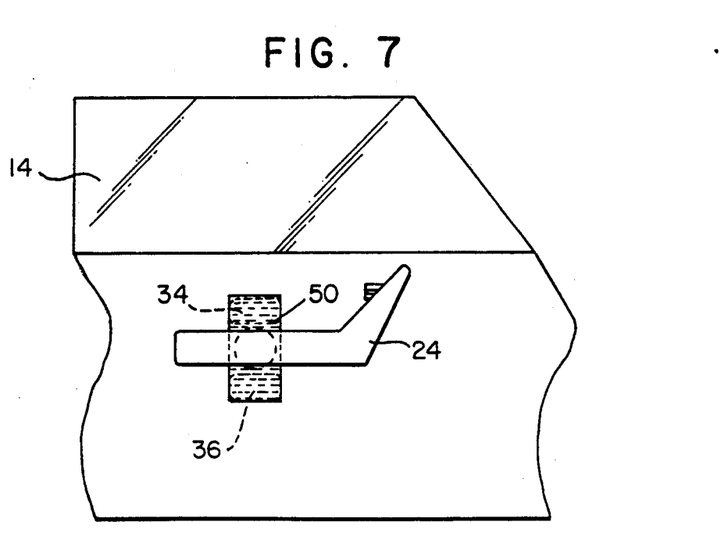
FIG. 7 is a front view showing the modified dual cushion air bag unit of FIG. 6.
Figure 8:
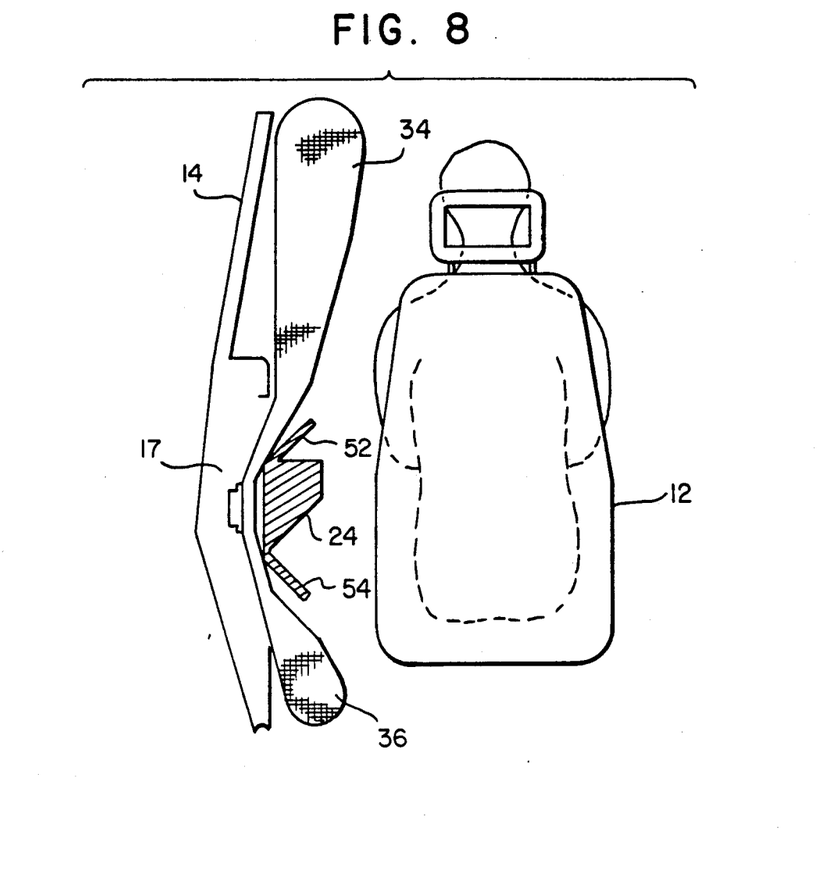
FIG. 8 is a view similar to that of FIG. 6 but showing the dual cushion air bag, immediately following deployment, in the inflated expanded condition thereof.
Figure 9:
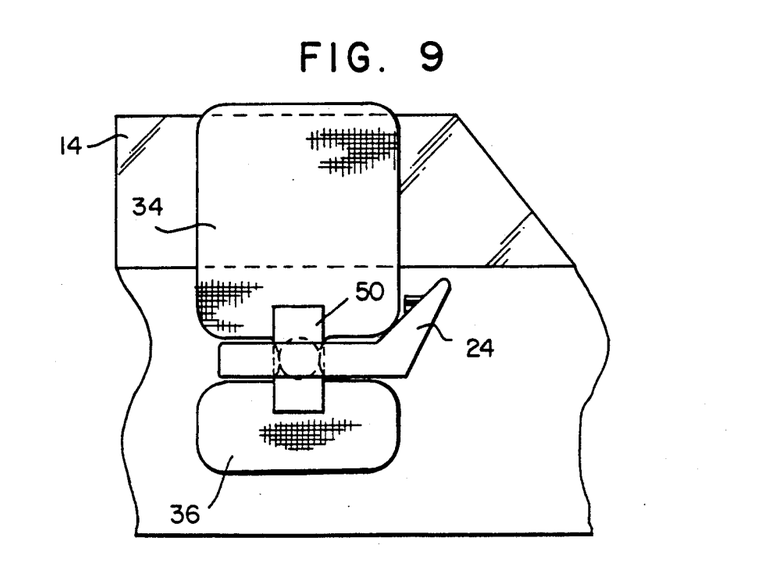
FIG. 9 is a front view similar to that of FIG. 7 but showing the dual cushion air bag in the inflated expanded condition thereof.

In the modification of the invention illustrated in FIGS. 6, 7, 8 and 9, a dual cushion air bag unit 18a is shown mounted in a reaction canister or housing 50. The air bag unit 18a may be identical to the air bag unit 18 described in connection with FIGS. 1-5 except for the manner in which the upper bag portion 34 and the lower bag portion 36 are positioned or folded as installed in the cavity 17 within the door 10 of the vehicle. Thus, as best seen in FIG. 7, the upper bag portion 34 and lower bag portion 36 are both folded to fit within the housing 50 the width of which is approximately one-fourth that of the air bag 22a, as best seen in FIG. 9.

As installed in the cavity 17 in the door 10 of the vehicle, housing 50 is positioned behind the arm rest 24 with the portion thereof containing the folded air bag portion 34 above the arm rest 24 and the portion thereof containing the folded lower air bag portion 36 below the arm rest 24. The dual cushion air bag unit 18a and the housing 50 may be attached to a mounting plate (not shown) such as the mounting plate 16 in the cavity 17 of FIG. 3 in a manner similar to that described in connection with the first described embodiment of the invention. Housing 50 desirably is so shaped internally including channel means therein indicated at 51 and 53 designed to channel the upper portion 34 and the lower portion 36, respectively, out of the housing 50 upon deployment of the dual cushion air bag 22.

Provided as upper and lower covers for the housing 50 to retain the folded air bag 22 therein are an upper padded push out panel 52 and a lower padded push out panel 54. Padded push out panels 52 and 54 are provided with appropriate tear seams or break out lines and are suitably hinged to the upper and lower surfaces of the arm rest 24, as shown.

As best seen in FIG. 8, upon deployment of the dual cushion air bag unit 18a, filling of the lower air bag portion 36 with inflating gas expands the portion 36 and causes it to push out the panel 54 to cause the latter to deflect angularly in a counterclockwise direction, thus guiding and allowing the lower bag portion 36 to expand downwardly. Similarly, filling the upper air bag 34 with inflating gas pushes the padded push out panel 52 causing it to deflect angularly in a clockwise direction, thus guiding and allowing the upper bag portion 34 to expand upwardly. A side view of each of the fully expanded upper and lower bag portions 34 and 36, respectively, is shown in FIG. 8, with a front view thereof being shown in FIG. 9.

In another embodiment of the invention, as illustrated in FIGS. 10-15, a dual cushion air bag unit 56 is provided with an elongated cylindrical or tube type inflator 58. Inflator 58 is of a type that conventionally is used on the passenger side of inflators in occupant restraint systems for providing protection against frontal impact in collisions. A form of inflator that may be utilized for the inflator 58 is disclosed in U.S. Pat. No. 4,296,084 to Gary V. Adams et al. and assigned to the assignee of the present invention.

Figure 10:
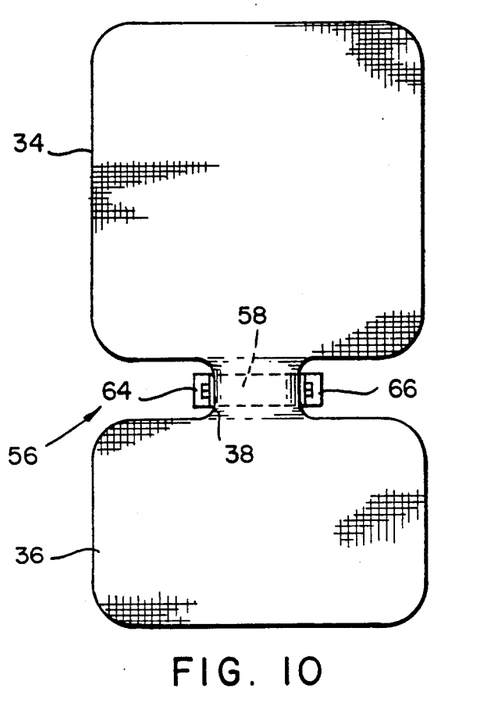
FIG. 10 is a front view of another modification of the dual cushion air bag unit of the present invention in an unfolded, unpressurized state illustrating the use therewith of a tube type inflator.
Figure 11:
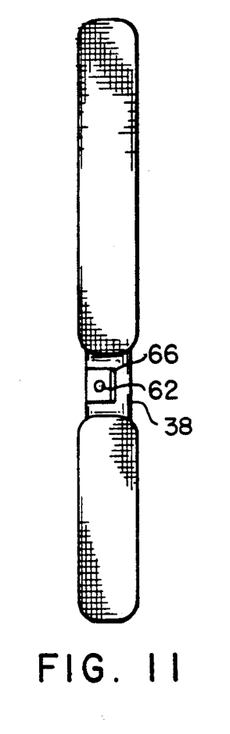
FIG. 11 is a side view of the dual cushion air bag unit of FIG. 10.
Figure 12:
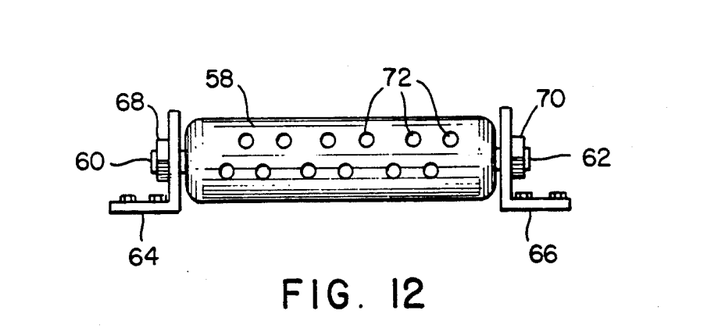
FIG. 12 is a top view illustrating the tube type inflator of FIG. 10 and mounting structure therefor.
Figure 13:
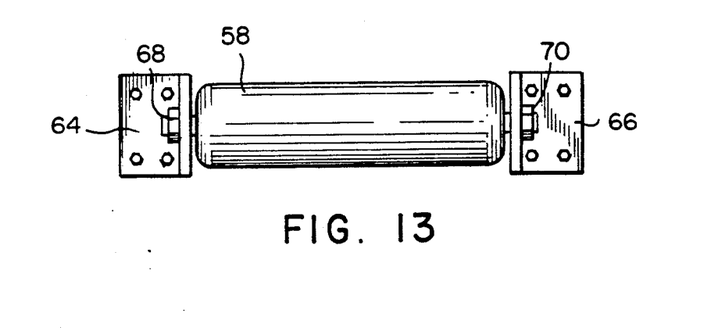
FIG. 13 is a side view of the tube type inflator of FIG. 12 and the mounting structure.

As shown in FIGS. 12 and 13, the tube-type inflator 58 is provided with a mounting stud 60 projecting out of one end and a similar mounting stud 62 projecting out of the other end. Right angle mounting brackets 64 and 66 are provided in association with studs 60 and 62, respectively, for facilitating the attachment of the inflator 58 to a mounting plate within a vehicle side panel or door such as the mounting plate 16 illustrated in FIGS. 1 and 3.

in this modification of the invention as seen by reference to FIGS. 10 and 11, the tube-type inflator 58 is entirely contained in sealed relation within the neck portion 38 of the dual cushion air bag 22, with the mounting studs 60 and 62 extending through an aperture in each end of the neck portion 38 of the air bag 22. Bolts 68 and 70 are provided in association with studs 60 and 62, respectively, for compressing the fabric of the neck portion 38 between the brackets 64 and 66 and the ends of the tube-type inflator 58 as required to provide the necessary seal. Suitable seal means may be provided, if desirable or necessary, to ensure sealing of inflator 58 within the neck portion 38 of the air bag 22.

Similarly to the inflator 20, the tube-type inflator 58 is characterized in being thrust neutral. That is to say, the generated gas issuing therefrom flows generally radially outwardly from a plurality of ports 72 that are appropriately arranged around the circumference of the inflator 58.

Figure 14:
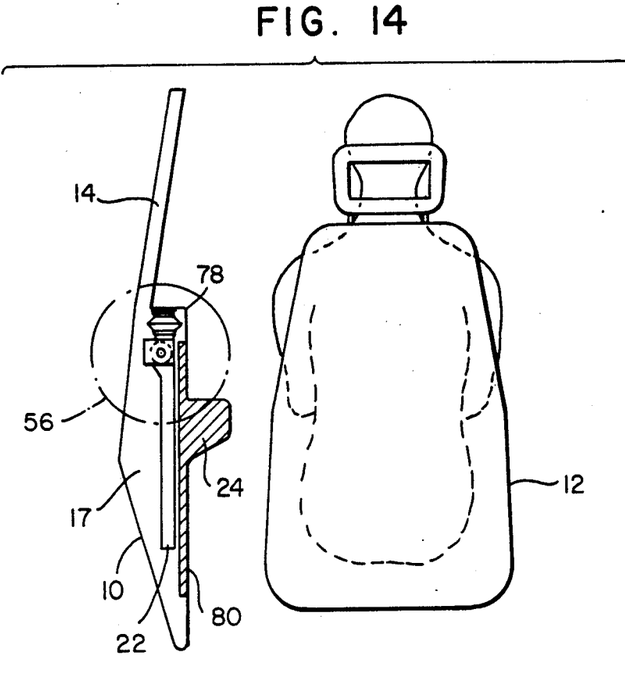
FIG. 14 is a sectional view through the door of a vehicle illustrating a further embodiment of a dual cushion air bag unit, according to the invention, utilizing the tube type inflator of FIGS. 12 and 13.
Figure 15:
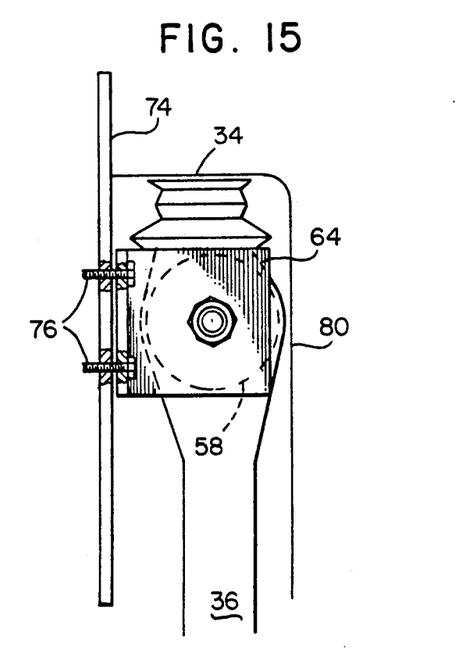
FIG. 15 is a side view illustrating the attachment of the dual cushion air bag unit of FIG. 14 to a supporting member or plate in a cavity within the door.

In FIGS. 14 and 15 there is illustrated a further embodiment of the invention utilizing the dual cushion air bag unit 56 shown in FIGS. 10 and 11. This embodiment of the invention is similar to that shown in FIGS. 1-5 in that the dual cushion air bag unit 46 is fastened to a mounting plate 74 within a cavity 17 above the arm rest 24 in the door 10 of the vehicle. Fastening is effected by means of a plurality of fasteners 76 through the holes provided in the brackets 62 and 64 and aligned holes in the mounting plate 74.

The dual cushion air bag unit 56, as best seen in FIGS. 10 and 11, includes an upper portion 34 and a lower portion 36 that are joined by a neck 38 in which the tube-type inflator 58 is contained in sealing relation. Installed in the door 10, as shown in FIG. 14, the lower portion 36 of the air bag 22 hangs downwardly in the cavity within the door 10 in an f unfolded and unpressurized state. The upper portion 34 of the air bag 22 is compactly folded with folds that extend over the entire width of the upper bag portion 34, as previously described and illustrated by dotted lines in connection with FIG. 2. The folded air-bag upper portion 34 is covered by a cover 78 that may be similar or even identical to the cover 42 shown in FIGS. 1 and 2 including, as described in connection with FIG. 2A, appropriate tear seams or break lines 43.

Also provided in FIG. 14, as in FIG. 1, is a padded push out panel 80 that may be similar to or identical to the padded push out panel 46 described in connection with FIG. 1.

Upon deployment of the dual cushion air bag unit 56 of FIGS. 14 and 15, the air bag 22 is inflated, with the lower portion 36 inflating downwardly and the upper portion 34 inflating upwardly, as illustrated in FIGS. 4 and 5.

Thus, in accordance with the invention, there has been provided an improved occupant restraint inflatable bag unit for absorbing energy produced by a side impact force on a vehicle body. There has been provided such an occupant restraint unit comprising a dual cushion air bag located in a side panel or door or other interior part of a vehicle with both portions of the air bag being inflated simultaneously by one inflator, which inflator is thrust neutral, and with the pressure in each portion being controlled by selecting proper materials of construction and by the use of proper venting.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the appended claims and their equivalents.

We claim:

1. A dual cushion air bag unit for absorbing energy impacting a side of a vehicle comprising:

a dual cushion air bag, said gab having an upper portion and a lower portion that ar joined by a relatively short and narrow neck portion which is integral therewith and in which an inflating gas mouth is formed, said neck portion being positioned between and in sealed communicating relation with said upper and lower portions both when uninflated and inflated, and an inflator having a first portion with a plurality of gas outlet ports therein, said first portion at least of said inflator extending inwardly into said inflating gas mouth and contained in sealed relation within said neck portion of said dual cushion air bag.

2. A dual cushion air bag unit as defined by claim 1 wherein said inflator is thrust neutral.

3. A dual cushion air bag unit as defined by claim 1 wherein said first portion of said inflator is substantially circular in transverse cross section with said gas outlet ports generally equally spaced around the circumference thereof whereby gas generated by said inflator flows generally radially outwardly from said ports with the production of substantially zero thrust.

4. A dual cushion air bag unit as defined by claim 1, wherein said dual cushion air bag when inflated forms a broad substantially planar air cushion,
wherein in the plane of such inflated dual cushion air bag said mouth is provided in the neck portion thereof,
wherein said first portion of said inflator is substantially circular in transverse cross section,
wherein said inflator includes a second portion with a flange at a position intermediate said first and second portions, said flange encircling said inflator and having a plurality of apertures therein, and further including
a retaining ring having a plurality of apertures therein, said apertures in said retaining ring being in alignment with those in said flange, and
a plurality of fasteners,
wherein said retaining ring is inserted through said mouth in said neck portion of said dual cushion air bag into the interior thereof in encircling relation to said mouth therein and affixed to the fabric thereof with said fasteners extending through the apertures in said retaining ring, through the apertures in the fabric of said neck portion, and through the apertures in said flange for securing said first portion of said inflator within said neck portion.

5. A dual cushion air bag unit as defined by claim 1, wherein said vehicle includes a side panel having a cavity therein,
wherein said inflator includes a second portion that is located externally of said neck portion of said dual cushion air bag, and
further including a mounting plate within the cavity of said side panel, and
means for fixedly attaching said second portion of said inflator to said mounting plate within the cavity of said side panel.

6. A dual cushion air bag unit as defined by claim 5 further including cover means for said dual cushion air bag unit, said cover means including frangible portions that allow said upper and lower portions of said dual cushion air bag to break out of the cavity in said side panel upon activation of said inflator and deployment of said dual cushion air bag.

7. A dual cushion air bag unit as defined by claim 5 wherein said vehicle includes an arm rest and said dual cushion air bag unit is mounted by said mounting means above said arm rest.

8. A dual cushion air bag unit as defined by claim 7, wherein said upper portion of said dual cushion air bag is compactly folded within the cavity in the side panel of said vehicle, and
wherein said lower portion of said dual cushion air bag is not folded and hangs downwardly in unpressurized state.

9. A dual cushion air bag unit for absorbing energy impacting a side of a vehicle comprising:
a dual cushion air bag, said bag having an upper portion, a lower portion, and a neck portion positioned between and in communication with said upper and lower portions,
an inflator having a first portion with a plurality of gas outlet ports therein, said first portion at least of said inflator being located in sealed relation within said neck portion of said dual cushion air bag,
wherein said vehicle includes a side panel having a cavity therein,
wherein said inflator includes a second portion that is located externally of said neck portion of said dual cushion air bag,
further including a mounting plate within the cavity of said side panel,
means for fixedly attaching said second portion of said inflator to said mounting plate within the cavity of said side panel,
wherein said vehicle includes an arm rest and said dual cushion air bag unit is mounted by said mounting means above said arm rest,
wherein said upper portion of said dual cushion air bag is compactly folded within the cavity in the side panel of said vehicle,
wherein said lower portion of said dual cushion air bag hangs downwardly in unpressurized state, and
further including cover means for said dual cushion air bag unit, said cover means including frangible portions that allow said upper and lower portions of said dual cushion air bag unit to break out of the cavity in said side panel upon activation of said inflator and deployment of said dual cushion air bag,
wherein said cover means includes a lid portion for said upper portion of said dual cushion air bag, said lid portion having a plurality of tear seams therein, and
wherein said cover means includes a padded push out panel for covering the lower portion of said dual cusion air bag.

10. A dual cushion air bag unit for absorbing energy impacting a side of a vehicle comprising:
a dual cushion air bag, said bag having an upper portion, a lower portion, and a neck portion positioned between and in communication with said upper and lower portions,
an inflator having a first portion with a plurality of gas outlet ports therein, said first portion at least of said inflator being located in sealed relation within said neck portion of said dual cushion air bag,
wherein said vehicle includes a side panel having a cavity therein,
wherein said inflator includes a second portion that is located externally of said neck portion of said dual cushion air bag,
further including a mounting plate within the cavity of said side panel,
means for fixedly attaching said second portion of said inflator to said mounting plate within the cavity of said side panel,
wherein said vehicle includes an arm rest and said dual cushion air bag unit is mounted by said mounting means above said arm rest,
wherein said upper portion of said dual cushion air bag is compactly folded within the cavity in the side panel of said vehicle,
wherein said lower portion of said dual cushion air bag hangs downwardly in unpressurized state,
further including cover means for said upper portion of said dual cushion air bag, said cover means including tear seams therein to allow said upper portion to break out upon deployment of said dual cushion air bag, and further including, a padded push out panel normally retained adjacent said lower portion of said dual cushion air bag but arranged to be pushed out upon deployment of said dual cushion air bag.

11. A dual cushion air bag unit as defined by claim 5 wherein said vehicle includes an arm rest and said dual cushion air bag is mounted by said mounting plate behind said arm rest.

12. A dual cushion air bag unit for absorbing energy impacting a side of a vehicle comprising:

a dual cushion air bag, said bag having an upper portion and a lower portion that are joined by a relatively short and narrow neck portion which is integral therewith and in which an inflating gas mouth is formed, said neck portion being positioned between and in sealed communicating relation with said upper and lower portions both when uninflated and inflated, and an inflator having a first portion with a plurality of gas outlet ports therein, said first portion at least of said inflator extending inwardly into said inflating gas mouth and contained in sealed relation within said neck portion of said dual cushion air bag, wherein said vehicle includes a side panel having a cavity wherein, wherein said inflator includes a second portion that is located externally of said neck portion of said dual cushion air bag, further including a mounting plate within the cavity of said side panel, means for fixedly attaching said second portion of said inflator to said mounting plate within the cavity of said side panel, wherein said vehicle includes an arm rest and said dual cushion air bag is mounted by said mounting plate behind said arm rest, and wherein both of said upper and lower portions of said air bag are compactly folded within the cavity in the side panel of said vehicle.

13. A dual cushion air bag unit as defined by claim 12 further including a housing therefor, said housing being fixedly attached to said second portion of said inflator and mounted by said mounting plate within the cavity in said side panel with said upper and lower portions of said dual cushion air bag positioned therein in compactly folded states above and below said inflator, respectively.

14. A dual cushion air bag unit for absorbing energy impacting a side of a vehicle comprising:

a dual cushion air bag, said bag having an upper portion, a lower portion, and a neck portion positioned between and in communication with said upper and lower portions, an inflator having a first portion with a plurality of gas outlet ports therein, said first portion at least of said inflator being located in sealed relation within said neck portion of said dual cushion air bag, wherein said vehicle includes a side panel having a cavity therein, wherein said inflator includes a second portion that is located externally of said neck portion of said dual cushion air bag, further including a mounting plate within the cavity of said side panel, means for fixedly attaching said second portion of said inflator to said mounting plate within the cavity of said side panel, wherein said vehicle includes an arm rest and said dual cushion air bag is mounted by said mounting plate behind said arm rest, wherein both of said upper and lower portions of said air bag are compactly folded within the cavity in the side panel of said vehicle, further including a housing therefor, said housing being fixedly attached to said second portion of said inflator and mounted by said mounting plate within the cavity in said side panel with said upper and lower portions of said dual cushion air bag positioned therein in compactly folded states above and below said inflator, respectively, and further including cover means for said housing, said cover means including padded push out panel means associated with said arm rest and having a hinged upper portion and a hinged lower portion with said hinged upper portion being deflectable in a clockwise direction to allow said upper portion of said dual cushion air bag to deploy therethrough and with said hinged lower portion deflectable in a counterclockwise direction to allow said lower portion or said dual cushion air bag to deploy therethrough.

15. A dual cushion air bag unit as defined in claim 14 wherein said housing means includes a first means to channel said upper portion of said dual cushion air bag through said hinged upper portion of said cover means and includes a second means to channel said lower portion of said dual cushion air bag through said hinged lower portion of said cover means upon deployment of said dual cushion air bag.

16. A dual cushion air bag unit for absorbing energy impacting a side of a vehicle comprising:

a dual cushion air bag, said bag having an upper portion, a lower portion, and a neck portion positioned between and in communication with said upper and lower portions, and an inflator having a first portion with a plurality of gas outlet ports therein, said first portion at least of said inflator being located in sealed relation within said neck portion of said dual cushion air bag, wherein said dual cushion air bag is made of fabric, wherein said inflator is of the tube type and includes threaded mounting studs with one of said mounting studs extending therefrom at each and, with said tube-type inflator being located within the neck portion of said dual cushion air bag with said studs protruding outwardly thereof through opposed apertures in the fabric thereof and further including a bracket provided in association with each of said mounting studs and fixedly attached thereto by bolt means.

17. A dual cushion air bag unit as defined by claim 16, wherein said vehicle includes a side panel having a cavity therein, and further including means for fixedly attaching each of said brackets to a mounting plate within the cavity of said side panel.

18. A dual cushion air bag unit as defined by claim 16 further including cover means for said dual cushion air bag unit, said cover including frangible portions that allow said upper and lower portions of said dual cushion air bag to break out of the cavity in said side panel upon activation of said tube-type inflator and deployment of said dual cushion air bag.

19. A dual cushion air bag unit as defined by claim 18 wherein said vehicle includes an arm rest and said dual cushion air bag unit is mounted by said mounting means above said arm rest,
  wherein said upper portion of said dual cushion air bag is compactly folded within the cavity in the side panel of said vehicle, and
  wherein said lower portion of said dual cushion air bag hangs downwardly in unpressurized state.

20. A dual cushion air bag unit as defined by claim 19 further including cover means for said upper portion of said dual cushion air bag, said cover means including tear seams therein to allow said upper portion to break out upon deployment of said dual cushion air bag, and further including,
  a padded push out panel normally retained adjacent said lower portion of said dual cushion air bag but arranged to be pushed out upon deployment of said dual cushion air bag.

* * * * *

UNITED STATES PATENT AND TRADEMARK OFFICE
CERTIFICATE OF CORRECTION

PATENT NO. : 5,324,072
DATED : 28 June 1994
INVENTOR(S) : Olson et al.

It is certified that error appears in the above-identified patent and that said Letters Patent is hereby corrected as shown below:

At column 7, line 44, "in this modification" should be -- In this modification --.

At column 8, line 11, "10 in an f" should be -- 10 in an --.

At column 8, line 52, "said gab having" should be -- said bag having --.

At column 8, line 53, "that ar joined" should be -- that are joined --.

At column 11, line 25, "cavity wherein," should be -- cavity therein,--.

At column 12, line 23, "portion or said dual" should be -- portion of said dual --.

At column 12, line 47, "therefrom at each and," should be -- therefrom at each end, --.

Signed and Sealed this

Sixth Day of September, 1994

Attest:

BRUCE LEHMAN

Attesting Officer

Commissioner of Patents and Trademarks